United States Patent Office 3,295,381
Patented Jan. 3, 1967

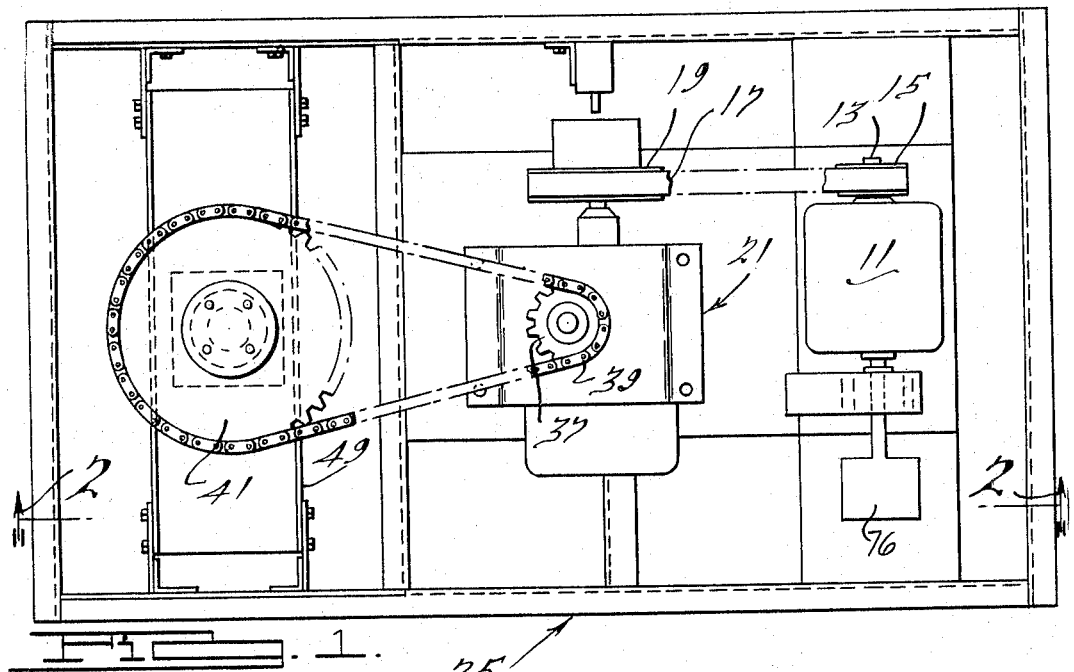
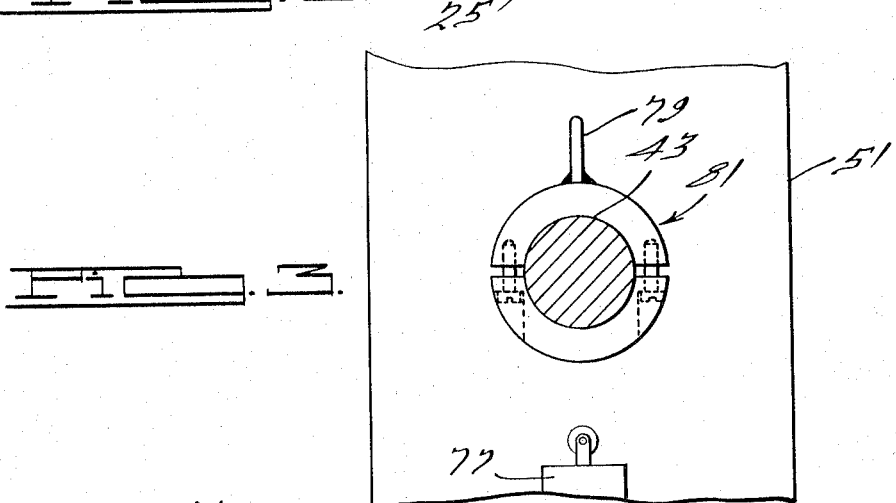
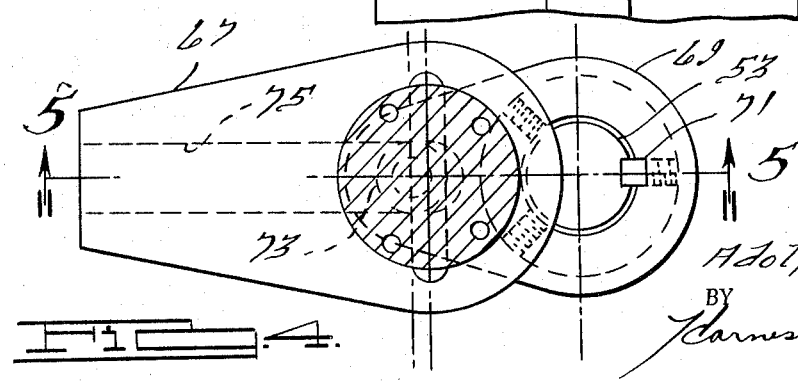

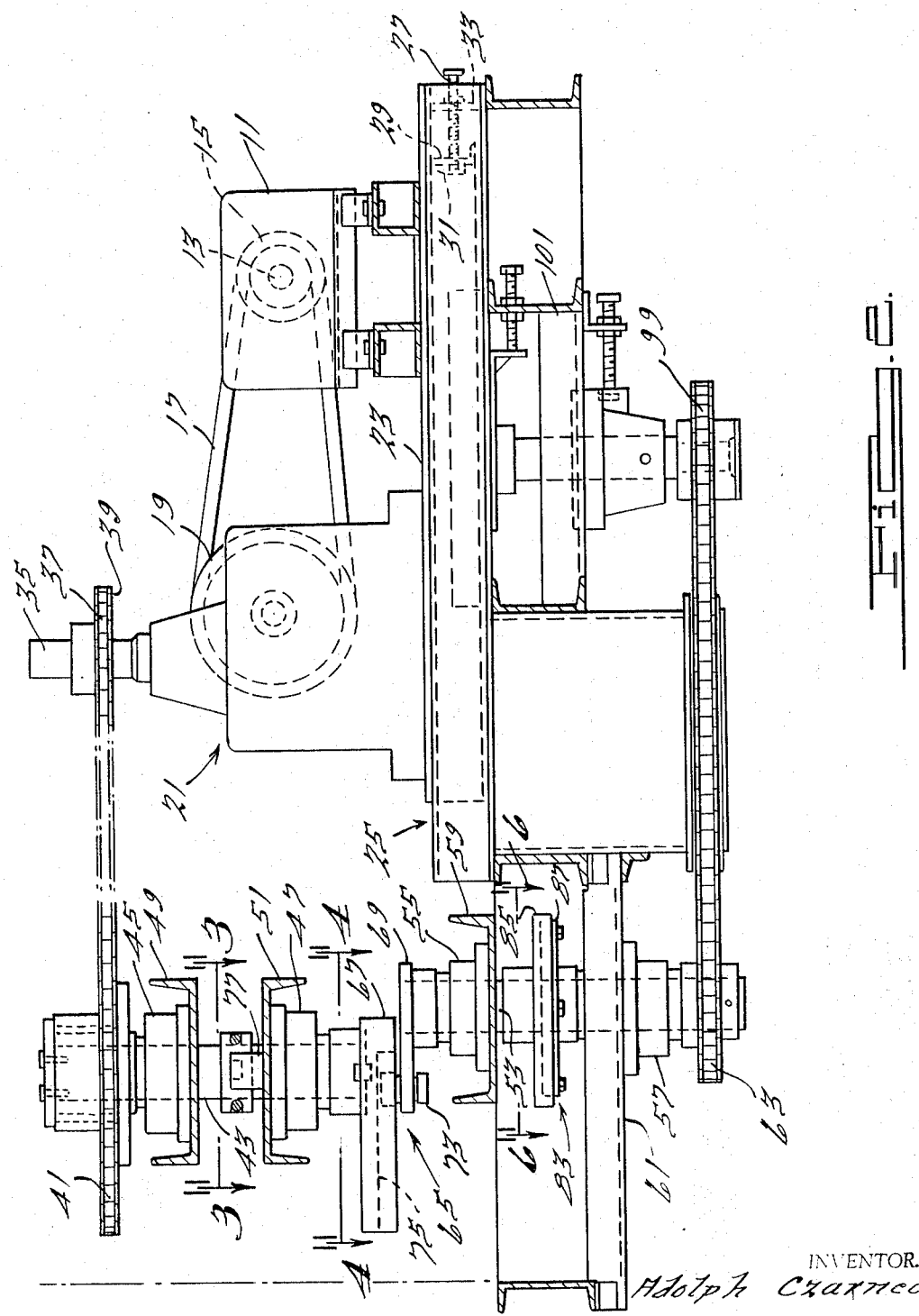

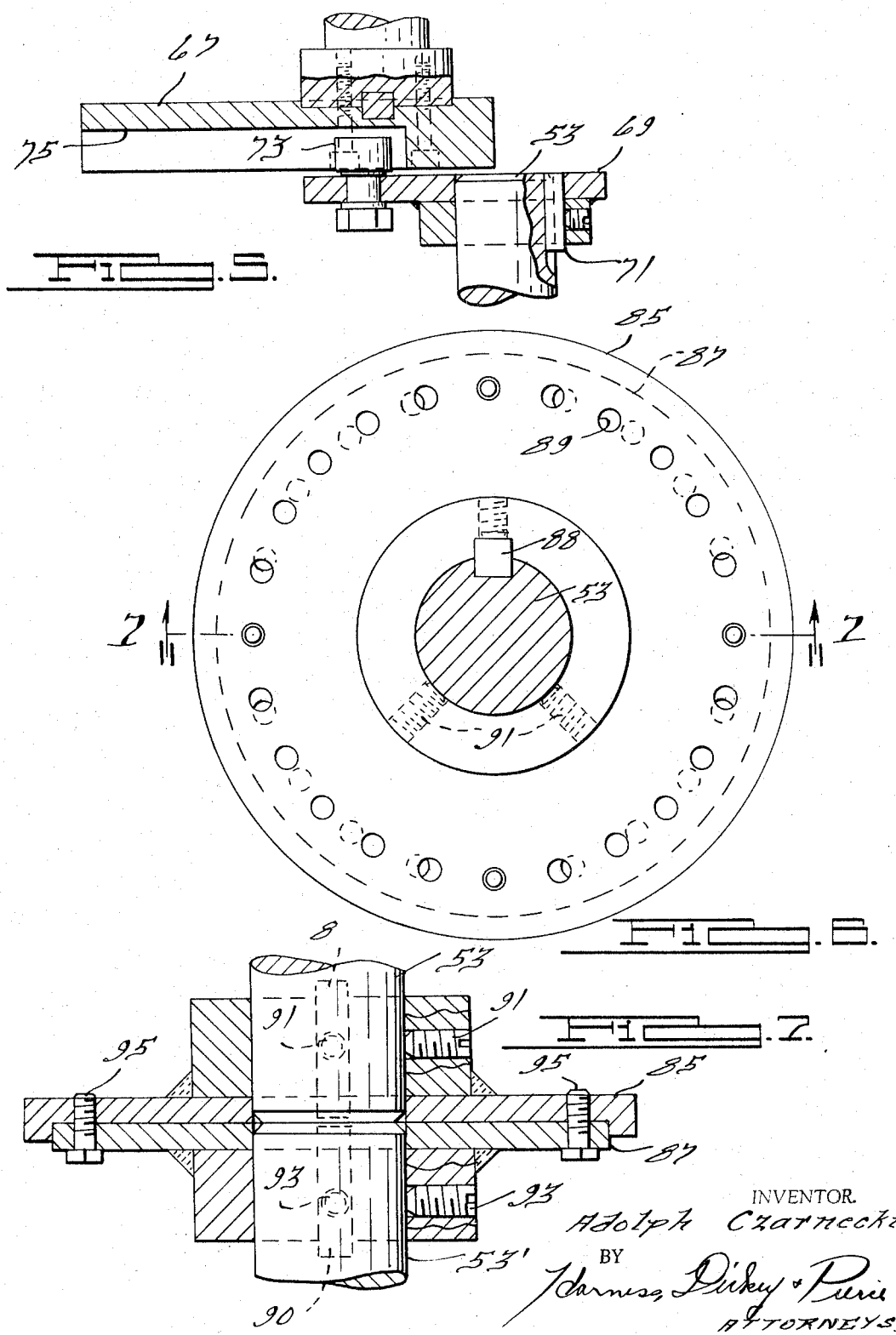

3,295,381
MECHANICAL INDEX DRIVE
Adolph Czarnecki, Birmingham, Mich., assignor to Anchor Steel and Conveyor Company, Dearborn, Mich., a corporation of Michigan
Filed May 4, 1964, Ser. No. 364,576
1 Claim. (Cl. 74—84)

This invention relate generally to varying speed transmissions, and particularly to a mechanical indexing device having a controlled cyclically varying speed output adapted to impart movement to a work conveyor.

In certain conveyor installations where a rotary drive source is used to impart movement to the conveyor, it is often necessary to modify the movement transmitted to the conveyor so that it is not driven in direct proportional speed relation to the drive source. Variable speed drive mechanisms capable of delivering a variety of constant speed outputs are known and are commercially available today. However, when the need arises for a cyclically varying speed drive for a conveyor, the conventional drive source must either be modified or replaced, or a suitable transmission mechanism interposed between the drive source and the conveyor.

One such need arises in conveyors adapted to deliver a series of workpieces to one or a series of working or work transfer stations. Conventionally, in this type of device, workpieces are fed intermittently by a conveyor having suitable work carrying mean spacedly mounted thereon. The conveyor advances and intermittently stops when each of the workpieces reaches the working or work transfer station where they are either transferred from the conveyor to another device or are worked upon as by a suitable machine tool.

The drive motion imparted to these conveyors must be intermittent and the conveyor stopping point must be accurately controlled to facilitate rapid and efficient plant operation.

Additionally, in large processing plant installations, workpieces are often delivered from station to station intermittently by conveyor assemblies extending throughout much of the plant. In an effort to minimize the effective plant space occupied by these conveyors, many manufacturers prefer the overhead trolley type conveyor wherein the bulk of the conveyor system is elevated above the general plant treatment area. The processing stations, however, are generally located at levels nearer the plant floor. Thus these conveyors are conventionally designed to descend to and ascend from the processing stations.

The work carrying means spacedly provided on these conveyors vary according to the particular plant needs and the nature of the workpieces handled. For example, various trays, hooks, clamps, or magnetic devices may be utilized with equal facility. However, one general need existing in many conveyor installations of this type is that the workpieces remain at a substantially constant inclination relative to the horizontal while undergoing movement throughout the plant. Thus, in the above type overhead installations, either the workpiece or the work carrying devices are suspended pendulously and are permitted to pivot freely relative to the conveyor under gravitational forces, to maintain this constant inclination. This, however, presents an additional problem in the intermittent type conveyor for when the conveyor is brought to a halt upon each of the workpieces reaching a treatment or work transfer station, the workpieces and the work carrying devices will be jerked and thereby caused to swing back and forth. In some cases, the conveyor stoppage may be so abrupt as to cause the workpieces to be detached from the work carrying devices. This, in turn, will preclude rapid delivery of the workpieces from the conveyor and will therefore reduce the plant efficiency since in most cases the workpiece swinging movement will have to cease before the work transfer or treatment operation can commence.

The problem is complicated further by the fact that in order to obtain optimum plant output, it is advantageous to have the workpieces, and therefore the conveyor, move as rapidly as possible between the intermittent stops. Thus, since the abruptness with which the conveyor stops, and therefore the swinging movement imparted to the workpiece and work carrying device, is directly related to the conveyor speed just prior to stopping, faster conveyor speeds will impart more swinging movement to the workpieces upon stopping and will increase the chances of workpieces being freed from the work carrying devices. It is desirable then for maximum plant efficiency to design the conveyor and conveyor drive so that the conveyor is moved rapidly between stops but that the stops be made smoothly and without excessive shock. The conveyor drive source could be designed to function in this way; however, such a drive source would in all probability be complicated and would therefore involve considerable expense.

The device of the present invention was developed particularly with the above type of work conveyor in mind and relates to a relative simple and inexpensive transmission mechanism adapted to deliver a cyclically varying speed output from a contant speed drive source. However, it is to be understood that this device will have use apart from this specific work conveyor. For example, this device wil find use in any installation wherein the driven device is to be cyclically accelerated and decelerated.

Briefly, this invention includes a mechanical indexing transmission device having an input shaft adapted for connection to a suitable rotary drive source. The transmission is provided with a rotatable output shaft adapted for connection to a suitable output device such as the conveyor elicited above and will drive the same intermittently. This transmision will convert the contant speed rotary input movement of the drive source to a cyclically varying speed rotary output motion. Specifically, the output shaft will undergo smooth acceleration and deceleration to maximum and minimum speeds, respectively, the minimum speed being selected to coincide with the point of delivery of the workpieces from the conveyor to the treatment station or to another work handling device. A suitable braking device may be incorporated to momentarily stop the output shaft, and therefore the conveyor, at the point when the output shaft is operating at minimal speed. In this way, the workpieces and the work handling devices will be stopped smoothly at the work transfer point with substantially no swinging movement being imparted thereto since the stoppage occurs at the point of minimal conveyor speed. Also, by providing for rapid movement of the conveyor between stops, plant production and efficiency will be kept at an optimum and will be accompanied by smooth work handling.

It is an object therefore of the present invention to provide an improved motion transmission mechanism adapted to convert constant speed rotary input motion to cyclically varying speed output movement.

It is a further object of the present invention to provide an improved transmission of the above type wherein the output movement is alternately accelerated and decelerated to a maximum and minimal speed, respectively.

It is a further object of the present invention to provide an improved transmission of the above type having a braking device adapted for operation to stop the output motion at the point of minimum speed.

It is a further object of the present invention to provide an improved transmission of the above type wherein the output device is adapted to drive a workpiece conveyor.

It is a further object of the present invention to provide an improved transmission of the above type wherein workpieces carried by the conveyor are adapted to be intermittently delivered to a treatment station.

It is a further object of the present invention to provide an improved transmission of the above type wherein the point of stoppage for the transmission output is adjustable.

It is a further object of the present invention to provide an improved transmission of the above type wherein the braking device may be actuated directly therefrom.

It is a further object of the present invention to provide an improved transmission of the above type wherein the acceleration and deceleration movement are effected smoothly.

It is a further object of the present invention to provide an improved transmission of the above type capable of use with a variety of devices wherein a smoothly accelerated and decelerated rotary drive is required.

It is a further object of the present invention to provide an improved transmission of the above type which is relatively inexpensive to manufacture, rugged in construction and reliable in use.

These and other objects and advantages of the present invention will become more apparent from the following detailed description taken in conjunction with the drawings in which:

FIGURE 1 is a plan view of a device incorporating the principles of the present invention;

FIG. 2 is an enlarged sectional view of the structure of FIG. 1 taken along the line 2—2 thereof;

FIG. 3 is an enlarged sectional view of the structure of FIG. 2 taken along the line 3—3 thereof;

FIG. 4 is an enlarged sectional view of the structure of FIG. 2 taken along the line 4—4 thereof;

FIG. 5 is a sectional view of the structure of FIG. 4 taken along the line 5—5 thereof;

FIG. 6 is an enlarged sectional view of the structure of FIG. 2 taken along the line 6—6 thereof, and FIG. 7 is a sectional view of the structure of FIG. 6 taken along the line 7—7 thereof.

Referring now more specifically to the drawings, the rotary drive unit for the motion transmission device of the present invention includes a suitable electric motor 11 having a drive shaft 13 which carries a fixed pulley 15 in the usual manner. A conventional V-belt 17 is disposed over pulley 15 and a second pulley 19 which forms the input to a conventional speed reducer 21. Both the electric motor 11 and the speed reducer 21 are mounted on a base 23 which forms a part of a suitable supporting frame 25. A bolt 27 may be fixed to flange 29 integral with plate 23 by a nut 31 and threadedly received by a web 33 fixed to frame 25 to permit longitudinal adjustment of the drive unit on the frame.

Speed reducer 21 is provided with a driven shaft 35 having a conventional sprocket 37 fixed thereto. An endless chain 39 is disposed over sprocket 37 and a second sprocket 41 fixed to a shaft 43 which forms the input or drive to the motion transmission device of the present invention. As shown in FIG. 2, input shaft 43 is mounted for rotation in spaced bearings 45 and 47 carried by suitable supports 49 and 51, respectively, suitably fixed to frame 25. A driven shaft 53, forming the transmission device output, is mounted for rotation in spaced bearings 55 and 57 carried by supports 59 and 61, respectively, also suitably fixed to the frame. This output shaft 53 extends parallel to the input shaft 43 but is laterally offset therefrom a predetermined distance and has a suitable power take-off sprocket 63 fixed thereto in the usual manner.

A novel motion transmission device generally indicated at 65, FIG. 2, and shown in greater detail in FIG. 4, interconnects the input and output shafts 43 and 53 for transmitting constant speed rotation from the input shaft to a varying speed accelerating-decelerating rotary movement at the output shaft. This transmission is seen to include a cam arm 67 suitably fixed to and extending radially of the shaft 43 for rotation therewith. A cam follower arm 69 is fixed to the output shaft 53 through a conventional key 71 and is provided with a follower 73 spaced radially of the output shaft axis. This follower 73 is designed to be slidably received in a slot 75 which extends longitudinally of cam arm 67. Thus, as the input shaft 43 rotates, the output shaft 53 rotates according to a pattern determined by the cam and follower arrangement 65.

As shown in FIGS. 2 and 4, follower 73 is spaced from the axis of output shaft 53 a distance slightly greater than the distance between the axes of the input and output shafts. Thus, as shaft 43 and therefore cam 67 rotate, follower 73 and therefore shaft 53 will also rotate. Assuming the rotational speed of the input shaft 43 to be constant, the rotational speed of the output shaft 53 will vary from a minimum, when the cam and follower are in the position illustrated in FIGS. 2 and 4, to a maximum when the cam and follower are displaced 180° from the position illustrated. The transition from minimum to maximum speed and back to minimum speed for the output shaft 53 of this invention is extremely smooth owing to the particular cam and follower arrangement. Thus, the output shaft 53 will experience no jerks or otherwise abrupt changes in speed.

The spacing between the axis of the output shaft 53 and the follower pin 73 resulting in the slight offset between the follower pin axis and the input shaft axis as shown in FIGS. 2 and 4 is significant. First of all, the closer the pin axis comes to coinciding with the input shaft axis, the slower will be the rotational speed of the output shaft 53 at this point. However, if these axes be permitted to coincide, which would result in complete stoppage of the output shaft 53 at this point, continued rotation of the cam 67 would bind the cam 67 and follower 73 together since there would be no tendency for the pin and shaft axis to move out of alignment. By designing the cam 67 and follower 73 to achieve the relationship shown in FIGS. 2 and 4, continued rotation of cam 67 will displace follower 73 laterally from this dead-center position and no binding will occur.

If it be desired to stop the output shaft 53 when it reaches its point of minimal rotational speed, one need only halt rotation of the input shaft 43 at this point. Such a condition is desirable in the workpiece conveyor example elicited above and may be effected by applying a conventional electromagnetic brake 76 to the electric drive motor 11. The activation of this brake 76 may be precisely timed and controlled directly from the input 43 or output 53 transmission shafts. For example, a conventional limit switch 77 may be mounted on support 51 and is adapted, when actuated, to effect operation of the electromganetic brake 76 to stop the motor 11. Switch 77 may be actuated by a dog 79 adjustably attached to shaft 43 by a split ring assembly 81. Manifestly, the dog is so adjusted relative to the cam 67 and follower 73 arrangement that motor 11 will stop when the output shaft 53 reaches its minimal rotational speed. This switch 77 and brake arrangement may be designated to halt rotation of the output shaft as long as is needed after which the brake may be released in the usual manner.

In order to insure accuracy in the point of stoppage of the output shaft 53, this shaft is made of two confronting parts joined together by a coupling generally indicated at 83 and shown in greater detail in FIGS. 6 and 7. Thus, this coupling is seen to include a nesting pair of discs 85 and 87 drivingly connected to the confronting portions of shaft 53 and 53$^1$ by keys 88 and 90, respectively. As shown, disc 85 may be provided with a recessed portion for the reception of disc 87, and each disc may be provided with a plurality of angularly spaced threaded openings 89, the openings in disc 85 being spaced apart a distance different from those in disc 87. As shown, the discs 85 and 87 may be laterally adjustable relative to shaft portions 53 and 53¹ by set-screws 91 and 93, respectively, to permit accurate alignment between the disc openings 89. Therefore, by angular adjustment of disc 87 relative to disc 85 and therefore shaft 53 relative to shaft 53¹, the stopping point of the output shaft may be precisely controlled. Openings 89 are so arranged that nearly any relative angular adjustment between the discs 85 and 87 will align at least four sets of these openings. A plurality of screws 95 may then be threadedly positioned within these aligned openings, as shown in FIG. 7, to lock the discs together.

In the example set forth above, it was proposed to power an endless overhead conveyor from the transmission output shaft 53. To accomplish this end, sprocket 63 may have an endless chain 97 disposed thereover also disposed over a sprocket 99 adapted to power a conventional caterpillar conveyor drive 101. However, since this conveyor drive is given by way of example only and forms no part of the invention, the details thereof have been omitted and will not be described. Suffice it to say that the device driven from the output shaft 53 may be any device in which it is desired to cycle the rotational speed thereof through smooth acceleration and deceleration to a maximum and minimum speed, respectively. If it be desired to stop the device at the point of minimum speed, the electromagnetic brake control illustrated may be incorporated.

Thus, it can be seen that by the present invention there has been provided a simple but efficient rotational motion transmission device capable of translating a constant speed rotational speed input to a smoothly cyclically varying speed rotational output. While a specific embodiment of the present invention has been illustrated and described in detail above, various additions, modifications, omissions and substitutions may be made thereto without departing from the spirit of the invention as encompassed by the appended claim.

What is claimed is:

A rotary drive for cyclically indexing a work holding conveyor of the type having work supporting means suspended pendulously therefrom to move work on said support means to a predetermined position at the end of each operating cycle, and wherein the conveyor is accelerated at a constant rate during the first part of each cycle and decelerated to a final stop or dwell period also at a constant rate during the last part of each cycle, whereby to deliver the work to said position without swinging or agitation and whereby the work is essentially stationary at the time of delivery, said rotary drive comprising a drive shaft rotatable about a first axis, means rotating said drive shaft at a constant speed, a driven shaft rotatable about a second axis in spaced parallel relation to said first axis, cam means interconnecting said drive and driven shafts, said cam means including a first arm fixed to one of said shafts and having a radial cam way therein extending at least substantially to the rotational axis of said one shaft, a second arm fixed to the other of said shafts and having a cam follower fixed thereto and spaced radially of the rotational axis of said other shaft a distance only slightly greater than the space between said shafts whereby rotation of said drive shaft causes said follower to move along said radial way from a first position on one side of the rotational axis of said one shaft and spaced therefrom a distance substantially equal to the sum of the space between said shaft rotational axes and the space between the rotational axis of said other shaft and said follower, to a second position on the other side of the rotational axis of said one shaft and closely adjacent thereto, said driven shaft reaching a maximum angular velocity when said follower is in said first position and a minimum angular velocity and nearly stopping when said follower is in said second position, brake means for stopping said input shaft, switch means connected to said brake means for energizing the same, switch actuating means fixed to said input shaft and positioned to actuate said switch means and energize said brake means when said follower is substantially in said second position and said driven shaft is traveling substantially at said minimum velocity, said output shaft including a first and second portion operatively connected to said cam means and said conveyor, respectively, means interconnecting said first and second portions including a pair of confronting discs connected to said first and second portion, respectively, a plurality of angularly spaced holes formed in each said disc with the holes in one disc offset angularly in varying amounts from the holes in the other and said disc, bolt means adapted to extend through selected aligned ones of said holes in said discs permitting accurate angular adjustment of said discs relative to each other whereby to accurately angularly position said second portion to position said conveyor and said work when said brake means is energized.

References Cited by the Examiner

UNITED STATES PATENTS

| | | | |
|---|---|---|---|
| 287,195 | 10/1883 | Tobey et al. | 74—69 |
| 1,546,354 | 7/1925 | Tuppen | 192—2 |
| 2,036,626 | 4/1936 | Garratt | 74—571 |
| 2,211,418 | 8/1940 | Hallden | 74—69 |
| 2,947,184 | 9/1960 | Olson | 74—69 |
| 3,130,358 | 4/1964 | Lang | 318—371 |

FRED C. MATTERN, Jr., *Primary Examiner.*

BROUGHTON G. DURHAM, *Examiner.*

J. A. MARSHALL, D. H. THIEL,
*Assistant Examiners.*